United States Patent [19]
Rowan

[11] Patent Number: 5,822,403
[45] Date of Patent: Oct. 13, 1998

[54] AUTOMATED TELEPHONE HOLD DEVICE

[76] Inventor: James Rowan, 11 Hunters Court, Fonthill, Ontario, Canada, L0S 1E4

[21] Appl. No.: 697,207

[22] Filed: Aug. 21, 1996

[51] Int. Cl.$^6$ .............................. H04M 1/00; H04M 1/64
[52] U.S. Cl. ................................. 379/68; 379/87; 379/77; 379/393; 379/163
[58] Field of Search ................................ 379/67, 88, 89, 379/162, 163, 68, 87, 77, 393

[56] References Cited

U.S. PATENT DOCUMENTS

| | | | |
|---|---|---|---|
| 4,577,067 | 3/1986 | Levy et al. ................................ | 379/162 |
| 4,834,551 | 5/1989 | Katz ........................................ | 379/68 |
| 5,003,587 | 3/1991 | Forbes ..................................... | 379/162 |

Primary Examiner—Fan Tsang

[57] ABSTRACT

An automated telephone hold device including a housing with a visual indication mechanism, audible indication mechanism, and push button switch positioned on a top face thereof. Further included is a voice playback mechanism, decoder, phone interface, and sequential logic located within the housing. In use, the sequential logic allows a user on hold to depress the push button switch which, in turn, actuates the visual indication mechanism. At this point in time, the phone interface allows communication between the voice playback mechanism and the phone of the second party for prompting the second party to press a designated key on the phone thereof. Once the second party presses the designated key, the sequential logic mechanism is adapted to actuate the audible indication mechanism. Also, upon the user lifting the handset thereof from an inoperative orientation, the sequential logic mechanism prompts the phone interface to revert to a normal mode of operation.

5 Claims, 8 Drawing Sheets

SEQUENCE OF OPERATION

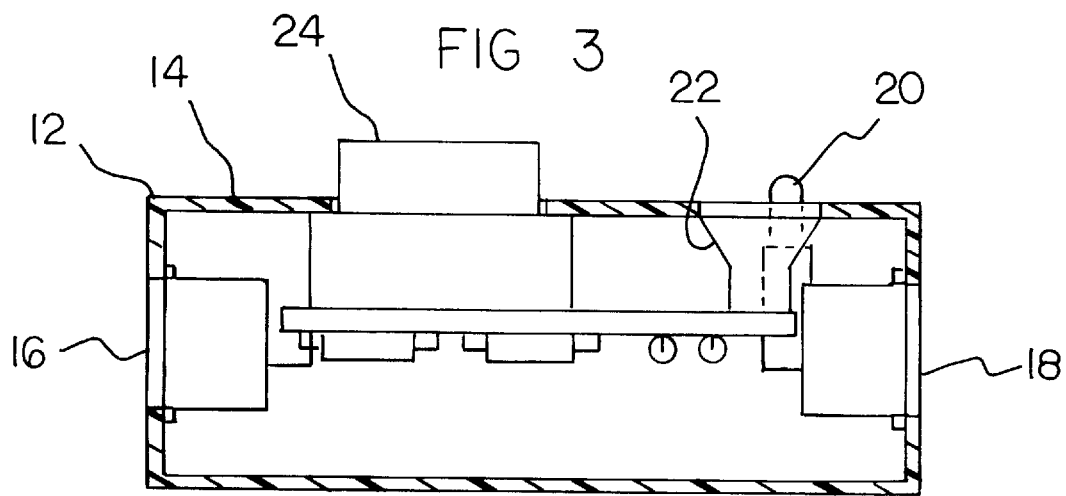
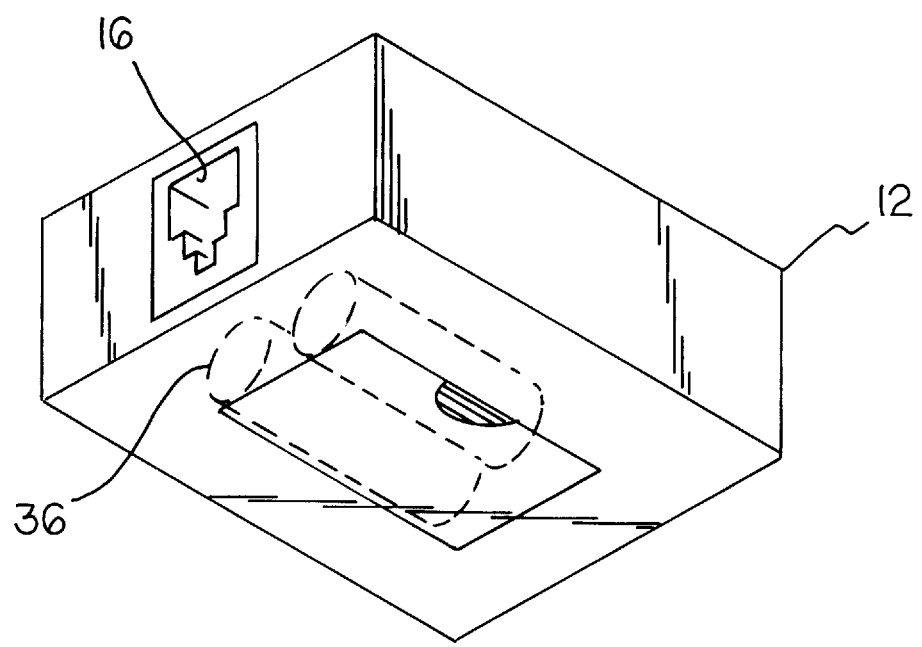

SEQUENCE OF OPERATION

AUTOMATED TELEPHONE HOLD DEVICE

BACKGROUND OF THE INVENTION

1. Field of the Invention

The present invention relates to an automated telephone hold device and more particularly pertains to allowing a first calling party placed on hold by a second calling party to place the second calling party on hold.

2. Description of the Prior Art

The use of telephone hold devices is known in the prior art. More specifically, telephone hold devices heretofore devised and utilized for the purpose of placing a second party on hold are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 5,218,628 to Ito a radio communication apparatus with means for requesting and displaying a status of wired line.

U.S. Pat. No. 5,315,644 to Lester et al. disclose a telephone interface circuit.

U.S. Pat. No. 5,231,657 to Umemoto et al. disclose a cordless telephone system that releases hold state of handset after intrusion by another party is detected.

U.S. Pat. No. 5,131,031 to Waldman discloses hold circuits for telephone systems.

U.S. Pat. No. 4,090,038 to Biggs discloses an audio signal on hold circuit.

Lastly, U.S. Pat. No. 5,195,087 to Bennett et al. disclose a telephone system with monitor on hold feature.

In this respect, the automated telephone hold device according to the present invention substantially departs from the conventional concepts and designs of the prior art, and in so doing provides an apparatus primarily developed for the purpose of allowing a first calling party placed on hold by a second calling party to place the second calling party on hold.

Therefore, it can be appreciated that there exists a continuing need for a new and improved automated telephone hold device which can be used for allowing a first calling party placed on hold by a second calling party to place the second calling party on hold. In this regard, the present invention substantially fulfills this need.

SUMMARY OF THE INVENTION

In view of the foregoing disadvantages inherent in the known types of telephone hold devices now present in the prior art, the present invention provides an improved automated telephone hold device. As such, the general purpose of the present invention, which will be described subsequently in greater detail, is to provide a new and improved automated telephone hold device which has all the advantages of the prior art and none of the disadvantages.

To attain this, the present invention essentially comprises a housing with a generally rectangular configuration. The housing has a top face, a bottom face, and a periphery formed therebetween thus defining an interior space. For providing releasable coupling with a phone of a user via a first line, the housing includes an input jack positioned on the periphery thereof. An output jack is also situated on the periphery of the housing. The output jack is adapted to releasably couple to a phone of a second party via a second line. Also included is a visual indication mechanism situated on the top face of the housing. The visual indication mechanism emits light upon the actuation thereof. As shown in FIG. 2, an audible indication mechanism comprising a piezoelectric buzzer is also positioned on the top face of the housing. The audible indication mechanism is adapted to emit an audible sound upon the actuation thereof. A switching mechanism in form of a push button is located on the top surface of the housing. The switching mechanism has a first unbiased orientation and second biased orientation upon the actuation thereof, wherein the second orientation is afforded via the depression of the push button. Further included is a voice playback mechanism situated within the interior space of the housing. The voice playback mechanism has an output for transmitting an audible prompting message therefrom. Such is afforded upon the receipt of a first voice activation signal at an input thereof. The voice playback mechanism is further adapted to transmit an audible confirmation message upon the receipt of a second voice activation signal at the input thereof. As best shown in the schematic of FIG. 5, a decoder mechanism located within the interior space of the housing is also included. The decoder mechanism includes an input for receiving signals. In operation, the decoder mechanism is adapted to provide a code verification signal at an output thereof upon the receipt and confirmation of a unique signal. Ideally, the unique signal is similar to that generated via the depression of a key associated with the phone of the second party. Also positioned within the interior space of the housing included is a phone interface mechanism which is coupled to the input jack and the output jack. The phone interface mechanism has an input coupled to the output of the voice playback mechanism and further an output connected to the input of the decoder mechanism. In use, the phone interface mechanism has a first mode of operation in which conventional communication is afforded between the input jack and the output jack of the housing. The phone interface mechanism also has a second mode of operation for providing communication between the voice playback mechanism and the output jack. Finally, a sequential logic mechanism is situated within the interior space of the housing and connected to the audible indication mechanism, visual indication mechanism, switching mechanism, voice playback mechanism, and phone interface mechanism. Upon actuation of the switching mechanism, the sequential logic mechanism is adapted to provide a first voice activation signal to the input of the voice playback mechanism. Also upon actuation of the switching mechanism, the sequential logic mechanism maintains the phone interface mechanism in a second mode of operation. The sequential logic mechanism effects continuous actuation of the visual indication mechanism while the phone interface mechanism is in the second mode of operation. Upon the receipt of the code verification signal, the sequential logic mechanism is adapted to provide a second voice activation signal to the input of the voice playback mechanism and allow the activation of the audible indication mechanism. Once a handset of the phone of the user is lifted to receive the call, the sequential logic mechanism converts the phone interface mechanism to the first mode of operation.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved automated telephone hold device which has all the advantages of the prior art telephone hold devices and none of the disadvantages.

It is another object of the present invention to provide a new and improved automated telephone hold device which may be easily and efficiently manufactured and marketed.

It is a further object of the present invention to provide a new and improved automated telephone hold device which is of a durable and reliable construction.

An even further object of the present invention is to provide a new and improved automated telephone hold device which is susceptible of a low cost of manufacture with regard to both materials and labor, and which accordingly is then susceptible of low prices of sale to the consuming public, thereby making such automated telephone hold device economically available to the buying public.

Still yet another object of the present invention is to provide a new and improved automated telephone hold device which provides in the apparatuses and methods of the prior art some of the advantages thereof, while simultaneously overcoming some of the disadvantages normally associated therewith.

Still another object of the present invention is to allowing a first calling party placed on hold by a second calling party to place the second calling party on hold.

Lastly, it is an object of the present invention to provide a new and improved automated telephone hold device including an input in communication with a phone of a user and an output in communication with a phone of a second party. Also included is an audible indication mechanism adapted to emit an audible sound upon the actuation thereof. A switching mechanism is included having a first orientation and a second orientation upon the depression thereof. Further included is a voice playback mechanism having an output for transmitting an audible prompting message therefrom upon the receipt of a voice activation signal at an input thereof. A decoder mechanism has an input for receiving signals, whereby the decoder is adapted to provide a code verification signal at an output thereof upon the receipt and confirmation of a unique signal. An interface is coupled to the input and the output for allowing communication with the phones. The interface has an input coupled to the output of the voice playback and an output connected to the input of the decoder. Finally, sequential logic is connected to the audible indication mechanism, switching mechanism, voice playback mechanism, and interface mechanism. Upon the actuation of the switching mechanism, the sequential logic is adapted to provide a voice activation signal to the input of the voice playback mechanism and further allow communication of the audible prompting message to the phone of the second party. After the receipt of the code verification signal, the sequential logic mechanism is further adapted to allow the activation of the audible indication mechanism and the interface mechanism to provide communication between the input and output.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view taken along line 3—3 shown in FIG. 2.

FIG. 4 is a perspective view of the present invention depicting batteries as a method of supplying power.

FIG. 12 is a layout of an alternate embodiment of the phone interface mechanism of the present invention.

Similar reference characters refer to similar parts throughout the several views of the drawings.

DESCRIPTION OF THE PREFERRED EMBODIMENT

Figure 1:
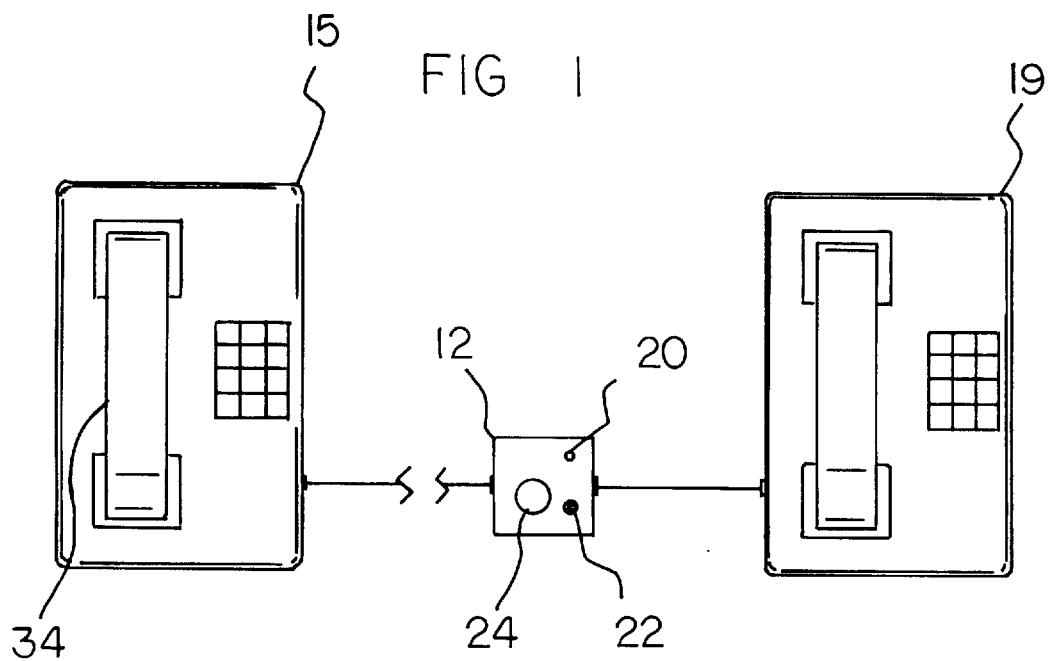
FIG. 1 is an illustration of the preferred embodiment of the automated telephone hold device constructed in accordance with the principles of the present invention.

With reference now to the drawings, and in particular to FIG. 1 thereof, a new and improved automated telephone hold device embodying the principles and concepts of the present invention and generally designated by the reference numeral 10 will be described.

The present invention, the new and improved automated telephone hold device, is comprised of a plurality of components. Such components in their broadest context include a housing, visual indication mechanism, audible indication mechanism, push button switch, voice playback mechanism, decoder, phone interface, and sequential logic. Such components are individually configured and correlated with respect to each other so as to attain the desired objective.

More specifically, it will be noted that system 10 of the present invention includes a housing 12 with a generally rectangular configuration. The housing has a top face 14, a bottom face, and a periphery formed therebetween thus defining an interior space. Preferably, the housing is constructed of durable plastic and has a length of approximately 2 inches, a width of approximately 2 inches, and a height of approximately ½ of an inch. For providing releasable coupling with a phone 15 of a user via a first line, the housing includes an input jack 16 positioned on the periphery thereof. An output jack 18 is also situated on the periphery of the housing. The output jack is adapted to releasably couple to a phone 19 of a second party via a second line. Such jacks are conventional in nature and are commercially available.

Also included is a visual indication mechanism 20 situated on the top face of the housing. The visual indication mechanism emits light upon the actuation thereof. Ideally, the visual indication mechanism includes an energy efficient light emitting diode. To afford optimal indication the light emitting diode may be adapted to emit light intermittently.

Figure 2:
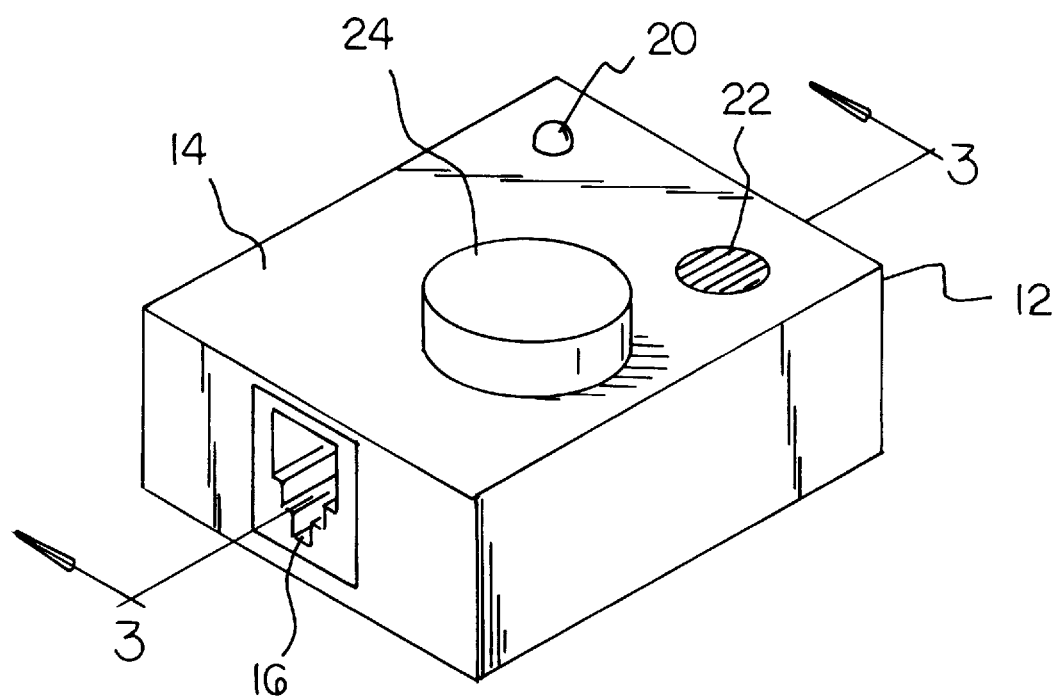
FIG. 2 is a perspective illustration of the present invention.
Figure 5:
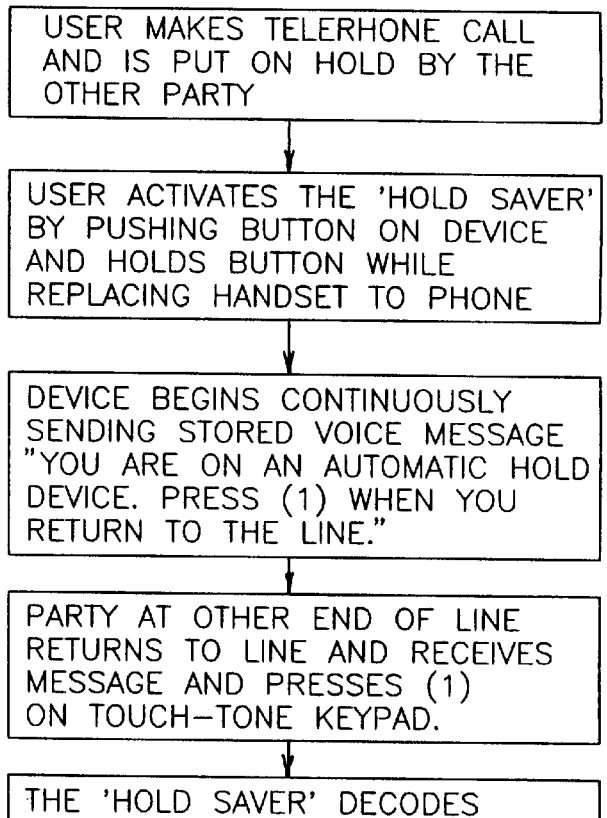
FIG. 5 is a flow chart describing the method associated with the present invention.

As shown in FIG. 2, an audible indication mechanism 22 comprising a piezoelectric buzzer is also positioned on the top face of the housing. The audible indication mechanism is adapted to emit an audible sound upon the actuation thereof.

A switching mechanism in form of a push button 24 is located on the top surface of the housing. The switching mechanism has a first unbiased orientation and second biased orientation upon the actuation thereof, wherein the second orientation is afforded via depression of the push button.

Further included is a voice playback mechanism 26 situated within the interior space of the housing. The voice playback mechanism has an output for transmitting an audible prompting message therefrom. Such is afforded upon the receipt of a first voice activation signal at an input thereof. The voice playback mechanism is further adapted to transmit an audible confirmation message upon the receipt of a second voice activation signal at the input thereof. Ideally, the voice playback mechanism effects playback by means of digital circuitry thus affording a compact and inexpensive method of playback ideally suitable for use in the present invention. It should be noted, however, that alternate means such as cassettes or other playback methods may also be employed for effecting a similar result. The playback mechanism suitably transmits the appropriate message every 10 seconds upon the receipt of the according voice activation signal.

Figure 9:
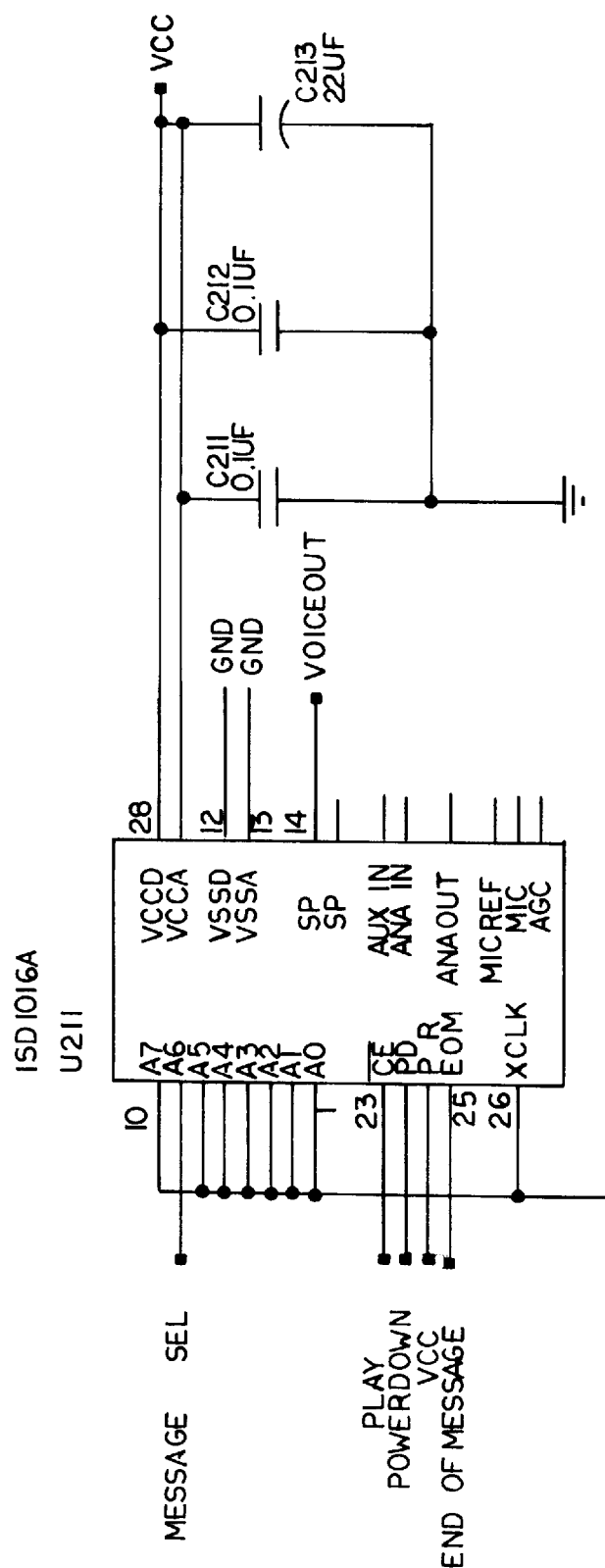
FIG. 9 is a schematic showing in detail the voice playback mechanism.

A detailed schematic of the voice playback mechanism is set forth in FIG. 9. It should be noted that the above mentioned first voice activation signal and second voice activation signal constitute different combinations of binary logic inputs to a message select pin and a play pin, both shown to be part of the micro-chip shown in FIG. 9. The first voice activation signal consists of a logic 0 on the message select pin and logic 0 on the play pin. The second voice activation signal consists of a logic 1 on the message select pin and logic 0 on the play pin. To save power, a power down pin may be supplied with a logic 1 which allows the micro-chip to require only 1–10 microamperes as opposed to the 10–30 microamperes required during operation.

Figure 6:
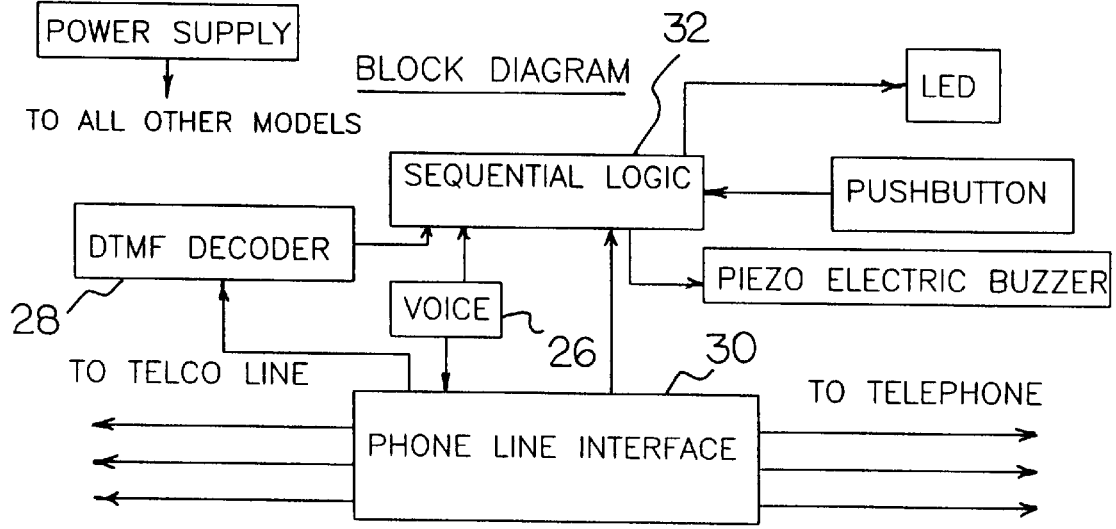
FIG. 6 is a schematic diagram depicting the interconnection of components utilized in the present invention.

As best shown in the schematic of FIG. 6, a decoder 28 is located within the interior space of the housing. Such decoder preferably consists of a DTMF decoder but may, however, be substituted with a simple filter. The decoder includes an input for receiving signals. In operation, the decoder is adapted to provide a code verification signal at an output thereof upon the receipt and confirmation of a unique signal. Ideally, the unique signal is similar to that generated via the depression of a key associated with the phone of the second party. Alternatively, voice activation technology may be employed in lieu of the aforementioned key method.

Figure 10:
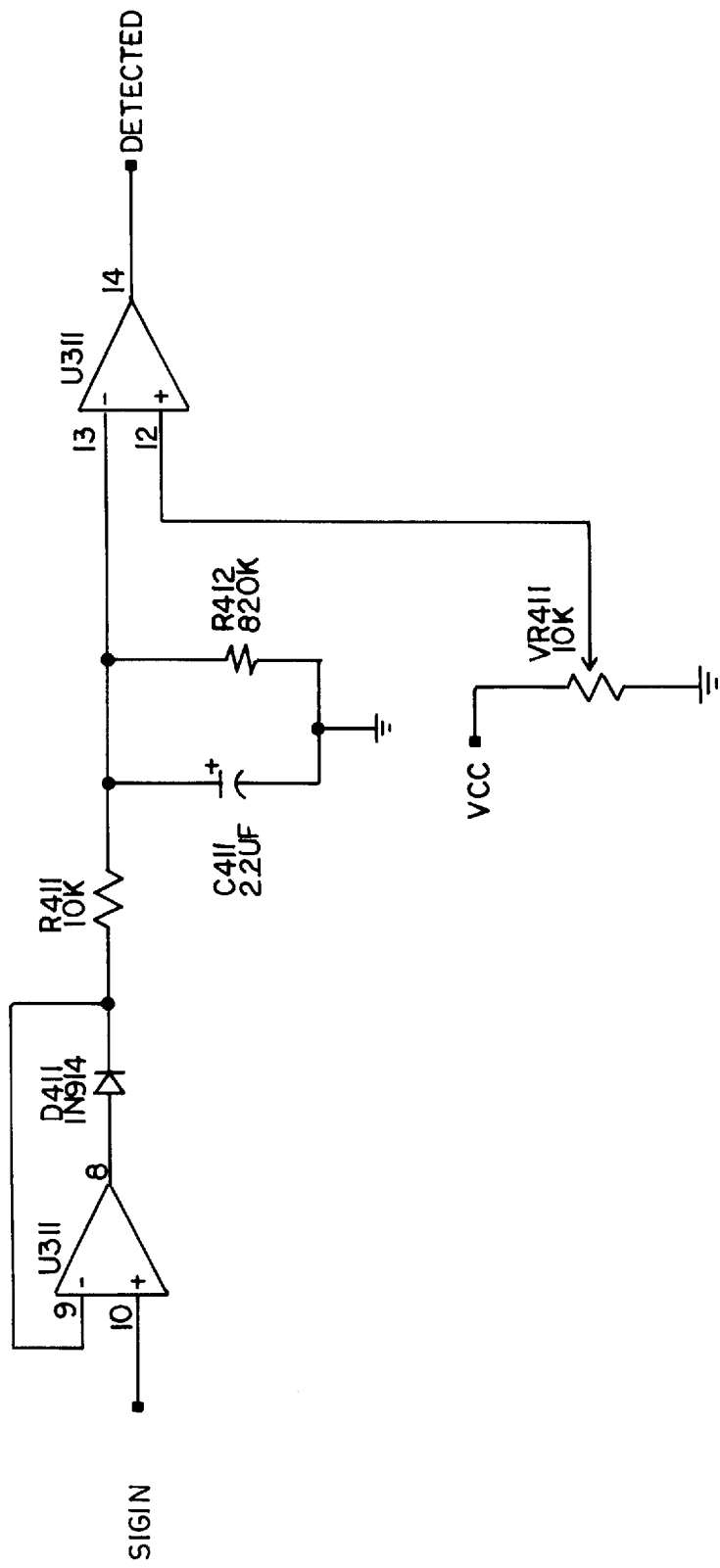
FIG. 10 is a layout of the decoder mechanism of the present invention.

As shown in FIG. 10, a more detailed schematic of the DTMF decoder is provided. From the schematic, it is evident that the DTMF decoder operates by rectifying an incoming voltage and further integrating the result. Basically, the decoder is adapted to provide the code verification signal upon the successful comparison of the integrated result with a reference voltage. Such reference voltage is namely that representative of a voltage delivered by the depression of the predetermined key of the second party's phone. To prevent false triggering of the decoder, the integrating function thereof is designed to be "leaky". In other words, a small constant input voltage will not result in an output. The amount of leakage determines the level of background noise the circuit will tolerate.

Also positioned within the interior space of the housing included is a phone interface 30 which is further coupled to the input jack and the output jack. The phone interface mechanism has an input coupled to the output of the voice playback mechanism and further an output connected to the input of the decoder. In use, the phone interface has a first mode of operation in which conventional communication is afforded between the input jack and the output jack of the housing. The phone interface also has a second mode of operation for providing communication between the voice playback mechanism, decoder and the output jack. The dual nature of the interface may be afforded by utilizing a capture line relay.

Figure 11:
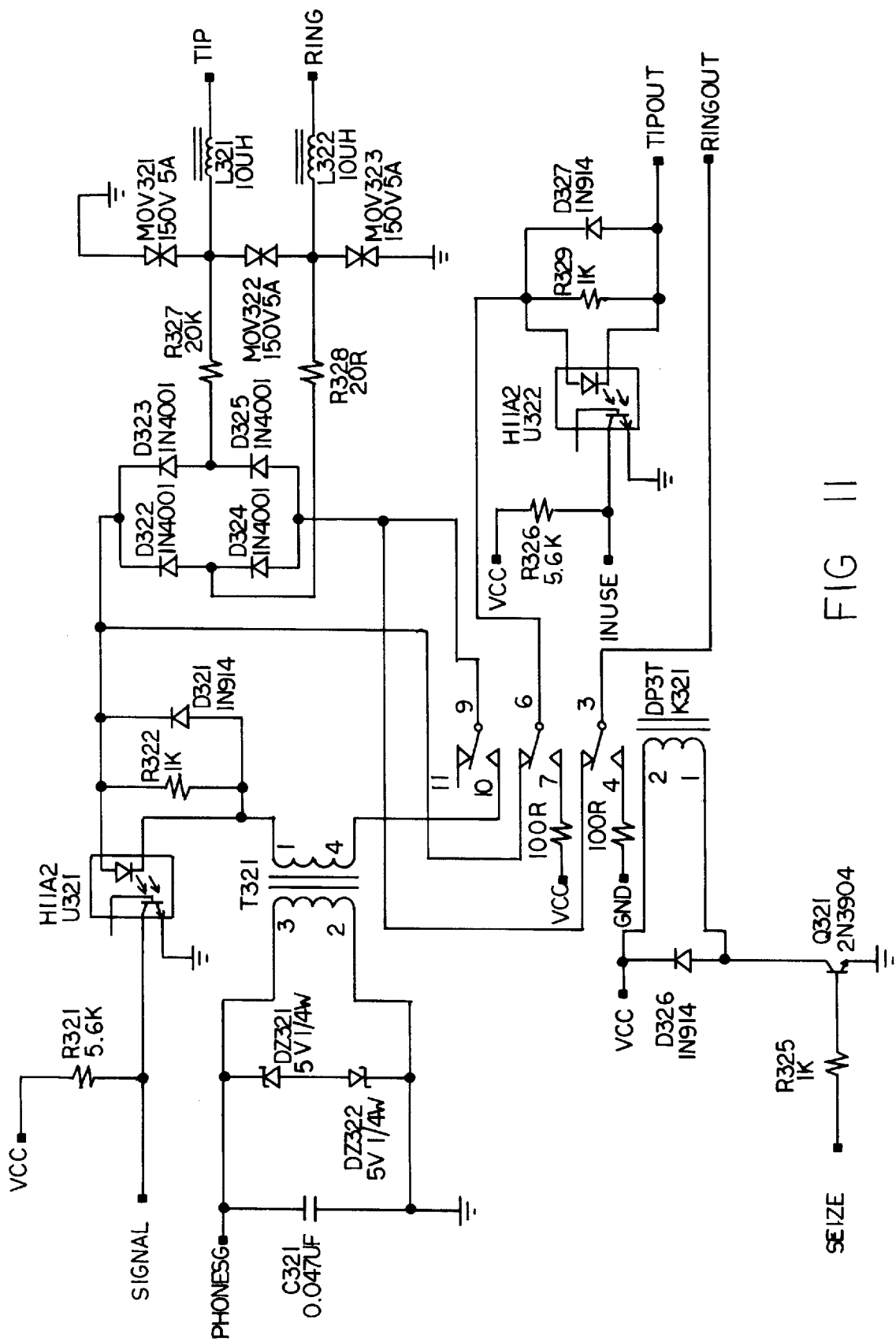
FIG. 11 is a schematic diagram of the phone interface of the present invention.

A more detailed schematic of the phone interface is shown in FIG. 11. It should be noted that components MOV1, MOV2, & MOV3 are provided so as to afford surge suppression thereby protecting the present invention from phone line transients. Also, diodes D3, D4, & D5 constitute a reverse polarity guard for protecting the device from telephone miswires. Transformer T1, shown in FIG. 11, is included for isolation purposes between the telephone line and the present invention. Finally, zener diodes DZ1 and DZ2 protect the present invention from ring bus voltages present if the device seizes the line during a ring. An alternate embodiment, as shown in FIG. 12, includes a reduced amount of components thus affording a more cost effective device.

Finally, a sequential logic mechanism 32 is situated within the interior space of the housing and connected to the audible indication mechanism, visual indication mechanism, switching mechanism, output of the voice playback mechanism, input of the decoder, and phone interface. Upon the actuation of the switching mechanism, the sequential logic mechanism is adapted to provide a first voice activation signal to the input of the voice playback mechanism thus allowing the transmission of the prompting message. Also upon the actuation of the switching mechanism, the sequential logic mechanism maintains the phone interface in a second mode of operation. The sequential logic mechanism effects continuous actuation of the visual indication mechanism while the phone interface mechanism is in the second mode of operation. Upon the receipt of the code verification signal, the sequential logic mechanism is adapted to provide a second voice activation signal to the input of the voice playback mechanism and allow the activation of the audible indication mechanism. It should be noted that upon the receipt of the code verification signal, the visual indication mechanism is no longer activated. Once a handset 34 of the phone of the user is lifted to receive the call, the sequential logic mechanism converts the phone interface to a first mode of operation. The phone interface then remains in the first mode of operation until the push button switch is again depressed.

As such, the controller circuitry essentially has three modes of operation. In a first normal mode of operation, the present invention allows-conventional communication between the phones of both parties. A second mode of operation is initiated by the actuation of the switching mechanism. In such a mode, the second calling party is prompted to press a predetermined key on the phone thereof and the user is notified via the visual indication mechanism of the status of the controller circuitry. Upon the receipt of the code verification signal, the controller circuitry has a third mode of operation in which the user is notified via the audio indication mechanism that the second calling party has pressed the key. In the third mode of operation, the second calling party is given a confirmation audio message requesting the second party to await response by the user.

In an alternate embodiment, the decoder may further be adapted to detect a dial tone. Upon the receipt of the dial tone while the phone interface is in the second mode of operation, the sequential logic mechanism is adapted to convert the phone interface to a first mode of operation automatically. In addition, a timer may be implemented in combination with the sequential logic mechanism so as to allow the conversion of the phone interface to a first mode of operation automatically after a predetermined amount of time in a second mode of operation. It should be further noted that batteries 36 may be utilized for supplying power to the present invention.

Figure 7:
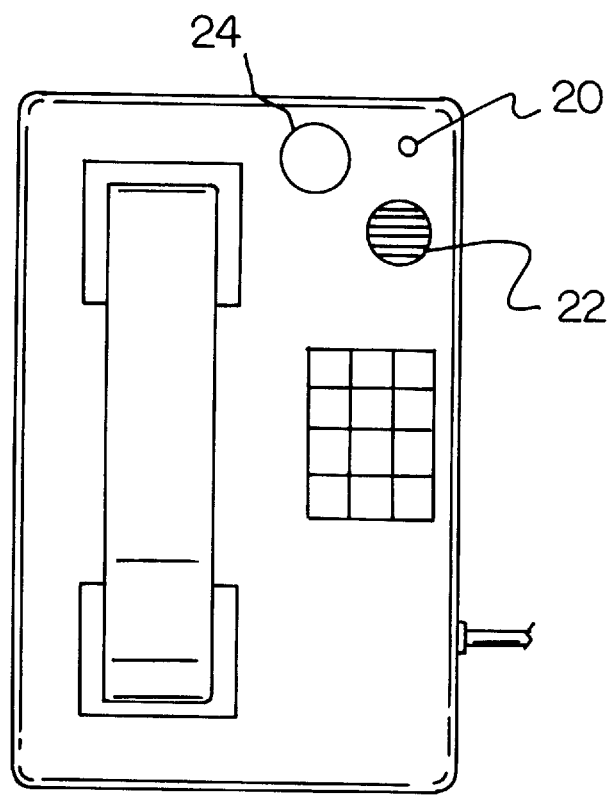
FIG. 7 is a front plan view of an alternate embodiment of the present invention.
Figure 8:
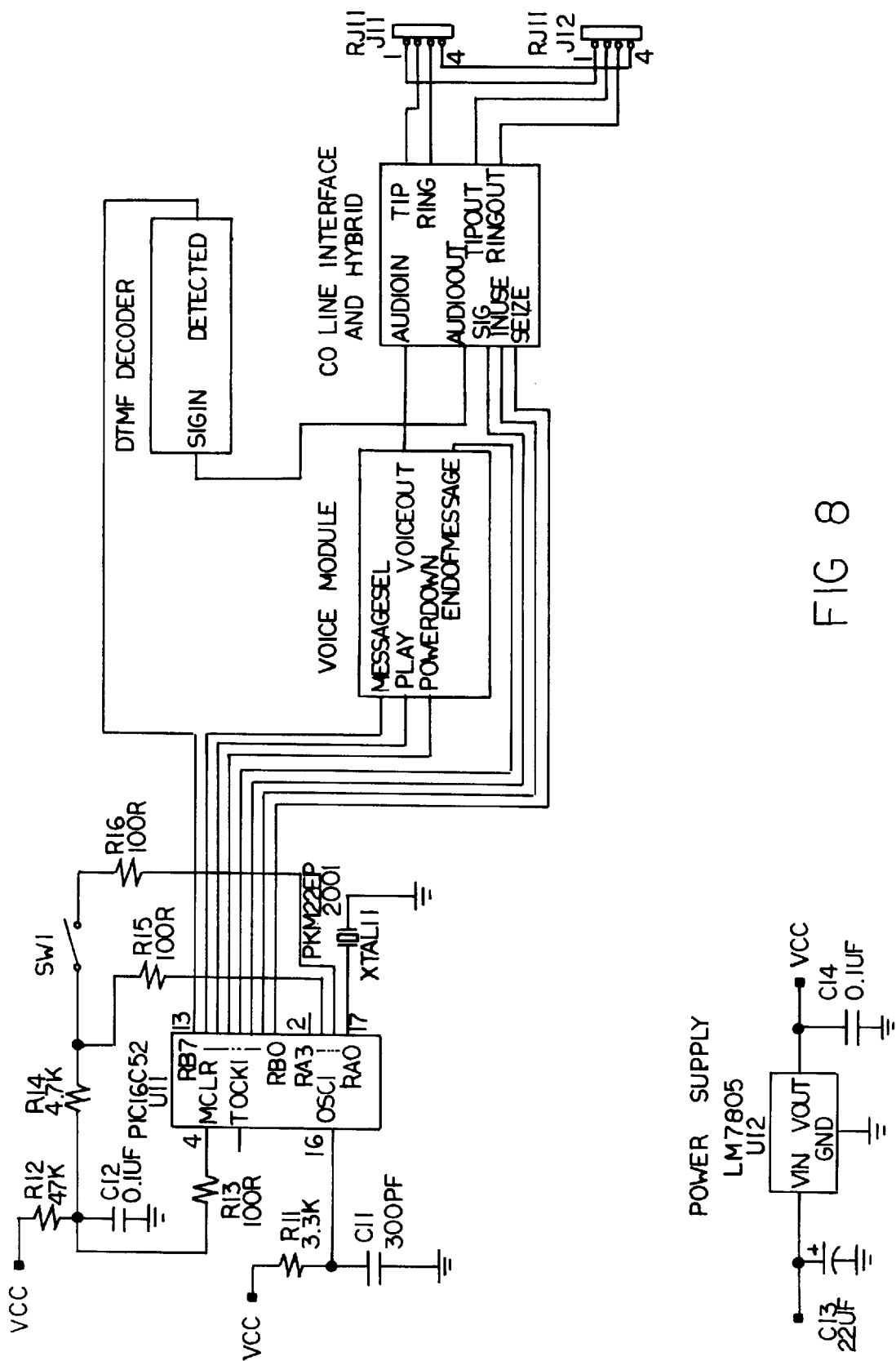
FIG. 8 is a more detailed schematic of the circuitry employed in the present invention.

In yet another alternate embodiment, shown in FIG. 7, the housing is eliminated in favor of integrating the vital above mentioned components within a conventional telephone.

In use, by providing the aforementioned components and features, the present invention offers a unique method of allowing a first calling party placed on hold by a second calling party to place the second calling party on hold. First, a user is placed on hold by a second party. The user may then depress the push button switch which, in turn, actuates the visual indication mechanism. At this point in time, the phone interface allows communication between the voice playback mechanism and the phone of the second party for prompting the second party to press a designated key on the phone thereof. If the second party fails to press the designated key in a predetermined amount of time, the phone interface automatically reverts to a first mode thereof in which normal communication is provided between the input jack and output jack. It should be noted that this normally results in the termination of the phone call since the handset of the user is in an inoperative orientation. If, however, the second party presses the designated key, the sequential logic mechanism is adapted to actuate the audible indication mechanism. Also, upon the user lifting the handset thereof from an inoperative orientation, the sequential logic mechanism prompts the phone interface to revert to a first mode of operation.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. A new and improved telephone hold device comprising, in combination:

a housing with a rectangular configuration having a top face, a bottom face, and a periphery formed therebetween defining an interior space, the housing including an input jack positioned on the periphery thereof for allowing releasable coupling with a phone of a user via a first line and an output jack also situated on the periphery thereof, wherein the output jack is adapted to releasably couple to a phone of a second party via a second line;

visual indication means situated on the top face of the housing for emitting light upon the actuation thereof;

audible indication means further positioned on the top face of the housing, the audible indication means adapted to emit an audible sound upon the actuation thereof;

switching means located on the top surface of the housing, the switching means adapted to be actuated manually by a user;

voice playback means situated within the interior space of the housing, the voice playback means having an output for transmitting an audible prompting message therefrom upon the receipt of a first voice activation signal at an input thereof and further transmitting an audible confirmation message upon the receipt of a second voice activation signal at the input thereof;

decoder means located within the interior space of the housing with the decoder means including an input for receiving signals, wherein the decoder means is adapted to provide a code verification signal at an output thereof upon the receipt and confirmation of a unique signal equivalent to that generated via the depression of a key associated with the phone of the second party;

phone interface means positioned within the interior space of the housing and further coupled to the input jack and the output jack, the phone interface means having an input coupled to the output of the voice playback means and an output connected to the input of the decoder means, wherein the phone interface means has a first mode of operation in which conventional communication is afforded between the input jack and the output jack of the housing and a second mode of operation for providing communication between the voice playback means and the output jack; and sequential logic means situated within the interior space of the housing and connected to the audible indication means, visual indication means, switching means, voice playback means, decoder means, and phone interface means, the sequential logic means adapted to provide a first voice activation signal to the input of the voice playback means and further maintain the phone interface means in a second mode of operation upon the actuation of the switching means, wherein the sequential logic means effects continuous actuation of the visual indication means while the phone interface means is in the second mode of operation, the sequential logic means further adapted to provide a second voice activation signal to the input of the voice playback means and allow the activation of the audible indication means upon the receipt of the code verification signal, wherein the sequential logic means converts the phone interface means to a first mode of operation upon a handset of the phone of the user is lifted to receive the call.

2. A telephone hold device comprising:

an input mechanism connected to a phone of a first party user being placed on hold; an output mechanism connected to a phone of a second party who placed the first party in hold;

audible indication means adapted to emit an audible sound to the first party upon receiving a control signal thereof;

switching means adapted to be actuated manually by the first party for activating the telephone hold device;

voice playback means having an output for transmitting an audible prompting message to the second party upon the receipt of a voice activation signal at an input thereof;

decoder means including an input for receiving signals, wherein the decoder means is adapted to provide a code verification signal at an output thereof upon the receipt and confirmation of a unique signal transmitted by the second party;

interface means coupled to the input mechanism and the output mechanism, the interface means having an input coupled to the output of the voice playback means and an output connected to the input of the decoder means; and sequential logic means connected to the audible indication means, switching means, voice playback means, decoder means, and interface means, the sequential logic means adapted to provide said voice activation signal to the input of the voice playback means and further allow communication of the audible prompting message to the output mechanism upon the actuation of the switching means by the firs party, the sequential logic means further adapted to generate said control signal for allowing the activation of the audible indication means upon the receipt of the code verification signal.

3. A telephone hold device as set forth in claim 2 and further comprising visual indication means for emitting light upon actuation thereof, wherein the sequential logic means actuates the visual indication means upon the actuation of the switching means.

4. A telephone hold device as set forth in claim 2 wherein the voice playback means is adapted to transmit an audible confirmation message upon the receipt of a second voice activation signal at an input thereof and the sequential logic means is adapted provide a second voice activation signal to the voice playback means upon the receipt of the code verification signal.

5. A telephone hold device as set forth in claim 2 wherein the unique signal is equivalent to that generated via the depression of a key associated with the phone of the second party.

* * * * *